United States Patent
Hrovat et al.

(10) Patent No.: US 9,925,841 B2
(45) Date of Patent: Mar. 27, 2018

(54) ACTIVE VEHICLE SUSPENSION

(71) Applicant: Ford Global Technologies, LLC, Dearborn, MI (US)

(72) Inventors: Davor David Hrovat, Ann Arbor, MI (US); Hongtei Eric Tseng, Canton, MI (US); Li Xu, Northville, MI (US); Dimitar Petrov Filev, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 83 days.

(21) Appl. No.: 14/853,166

(22) Filed: Sep. 14, 2015

(65) Prior Publication Data

US 2017/0072763 A1    Mar. 16, 2017

(51) Int. Cl.
*B60G 17/0165* (2006.01)

(52) U.S. Cl.
CPC ...... *B60G 17/0165* (2013.01); *B60G 2400/96* (2013.01); *B60G 2600/70* (2013.01)

(58) Field of Classification Search
CPC .................................................. B60G 17/0165
See application file for complete search history.

(56) References Cited

U.S. PATENT DOCUMENTS

| 4,468,050 | A * | 8/1984 | Woods | B60G 17/0155 |
| | | | | 280/5.503 |
| 7,639,148 | B2 | 12/2009 | Victor | |
| 8,483,909 | B2 | 7/2013 | Visconti et al. | |
| 8,948,930 | B2 | 2/2015 | Leinfelder | |
| 2003/0230443 | A1* | 12/2003 | Cramer | B60G 3/20 |
| | | | | 180/65.51 |
| 2007/0073944 | A1* | 3/2007 | Gormley | B60R 16/0231 |
| | | | | 710/72 |
| 2008/0119994 | A1 | 5/2008 | Kameyama | |
| 2008/0183353 | A1* | 7/2008 | Post | B60G 17/0165 |
| | | | | 701/42 |
| 2008/0243334 | A1* | 10/2008 | Bujak | B60G 17/0165 |
| | | | | 701/37 |
| 2010/0324781 | A1 | 12/2010 | Gagliano | |
| 2012/0143398 | A1* | 6/2012 | Takeuchi | B60W 40/12 |
| | | | | 701/1 |
| 2012/0160621 | A1* | 6/2012 | Battlogg | B60G 17/08 |
| | | | | 188/267.2 |
| 2012/0221228 | A1* | 8/2012 | Noumura | B60W 40/09 |
| | | | | 701/110 |
| 2014/0244110 | A1* | 8/2014 | Tharaldson | G07C 5/008 |
| | | | | 701/36 |
| 2014/0347458 | A1 | 11/2014 | Tijerina et al. | |

(Continued)

FOREIGN PATENT DOCUMENTS

WO    WO 2014149657 A1    9/2014
WO       2015057143 A1    4/2015

OTHER PUBLICATIONS

UK Search Report dated Feb. 28, 2007 (3 pages).

*Primary Examiner* — Behrang Badii
*Assistant Examiner* — Daniel L Greene
(74) *Attorney, Agent, or Firm* — Frank A. MacKenzie; Bejin Bieneman PLC

(57) ABSTRACT

A user device is identified as being operated by a vehicle occupant. An operation being performed by the user device is identified. A road condition is determined. A vehicle suspension is adjusted based at least in part on the identified user device operation and the road condition.

20 Claims, 2 Drawing Sheets

(56) References Cited

U.S. PATENT DOCUMENTS

| | | |
|---|---|---|
| 2015/0112512 A1 | 4/2015 | Fan et al. |
| 2015/0149035 A1 | 5/2015 | Enthaler et al. |
| 2015/0224845 A1* | 8/2015 | Anderson ............ B60G 17/019 701/37 |
| 2016/0003621 A1* | 1/2016 | Koenig .................. G01C 21/00 701/31.4 |
| 2016/0176409 A1 | 6/2016 | Kirsch et al. |

* cited by examiner

ACTIVE VEHICLE SUSPENSION

BACKGROUND

Occupants often use portable computing devices in vehicles. An occupant not driving a vehicle, e.g., a passenger, or an operator of an autonomous or partially autonomous vehicle, may perform varied operations on a user device, e.g., viewing media content, writing documents, voice communications, etc. However, a condition of the road on which a vehicle is operated may not be conducive to certain operations of the user device, resulting in an increased input error rate, motion sickness, etc. for the occupant.

DETAILED DESCRIPTION

Figure 1:
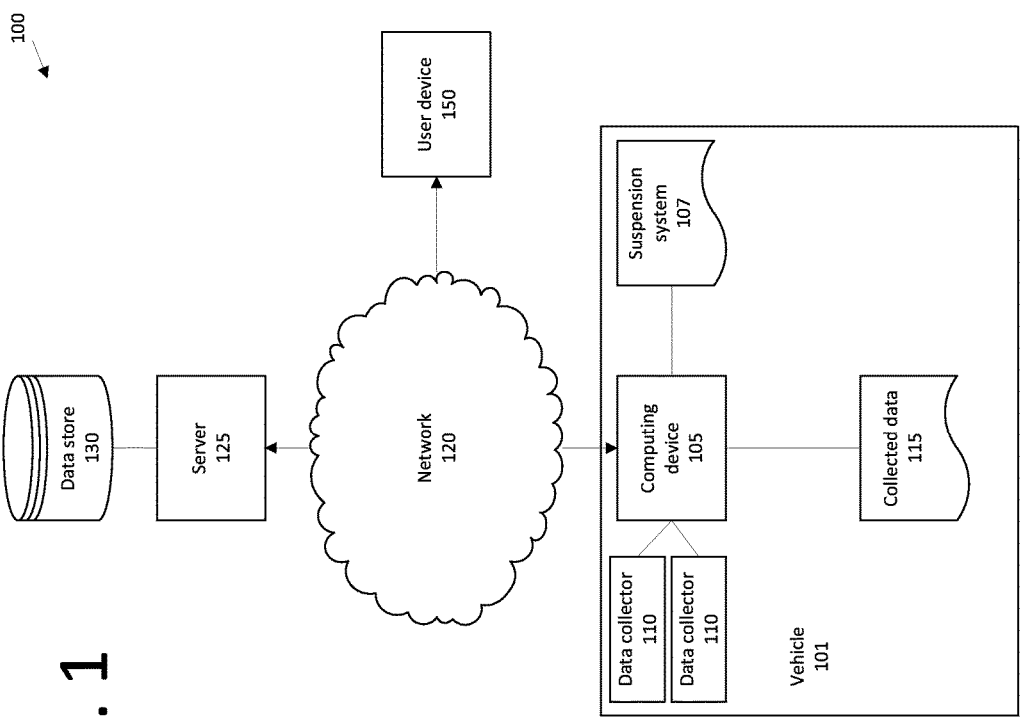
FIG. 1 is a view of an exemplary system for adjusting a vehicle suspension system.

FIG. 1 illustrates an example system 100 for adjusting a vehicle 101 suspension system. The system 100 includes a computing device 105 in the vehicle 101, a suspension system 107, data collectors 110, and collected data 115. The computing device 105 includes programming and hardware such as is known to receive information via various vehicle 101 sources, e.g., the collected data 115, from the data collectors 110 concerning various metrics related to the vehicle 101. For example, the data 115 may include a speed (i.e., velocity) of the vehicle 101, vehicle 101 acceleration and/or deceleration, data related to a vehicle 101 path or steering, biometric data related to a vehicle 101 operator, e.g., heart rate, respiration, pupil dilation, body temperature, state of consciousness, etc. Further examples of data 115 may include data indicating whether vehicle sub-systems (e.g., a steering system, a powertrain system, a brake system, internal sensing, external sensing, etc.) are operational, and/or data 115 relating to a state of such sub-systems, e.g., a steering wheel torque, brake pressure, engine torque, etc. The computing device 105 may be configured to collect data 115 from the vehicle 101 in which it is installed, i.e., a first or host vehicle, and/or may be configured to collect data 115 from another vehicle 101, e.g., a second or target vehicle.

The computing device 105 is generally configured, i.e., programmed and/or provided with hardware, for communications on a controller area network (CAN) bus or the like. The computing device 105 may also have a connection to an onboard diagnostics connector (OBD-II). Via the CAN bus, OBD-II, and/or other wired or wireless mechanisms, the computing device 105 may transmit messages to various devices in a vehicle and/or receive messages from the various devices, e.g., controllers, actuators, sensors, etc., including data collectors 110. Alternatively or additionally, in cases where the computing device 105 actually comprises multiple devices, the CAN bus or the like may be used for communications between devices represented as the computing device 105 in this disclosure. In addition, the computing device 105 may be configured for communicating with the network 120, which, as described below, may include various wired and/or wireless networking technologies, e.g., cellular, Bluetooth, wired and/or wireless packet networks, etc.

Possibly included in instructions stored in and executed by the computer 105 are instructions for partially or fully autonomously, i.e., without driver intervention, operating the vehicle 101. Using data received in the computer 105, e.g., from data collectors 110, the server 125, etc., the computer 105 may provide instructions to control various vehicle 101 components and/or operations without a driver to operate the vehicle 101. For example, the computer 105 may regulate vehicle 101 speed, acceleration, deceleration, steering, operation of components such as lights, windshield wipers, etc. The instructions and various vehicle 101 components may thus provide for autonomous or semi-autonomous operation of the vehicle 101.

The vehicle 101 further includes a suspension system 107. The suspension system 107 is an active suspension such as is known that uses hydraulics and motors to dynamically, e.g., while the vehicle is being driven according to various inputs, adjust the suspension of the vehicle 101, smoothing the ride for the occupant and/or providing desired handling characteristics of the vehicle 101, e.g., smoother ride but less responsive to driver steering inputs, rougher ride but more responsive to driver steering inputs, etc. For example, the suspension system 107 may be adjusted during operation of the vehicle 101 to provide a smoother ride for the occupant. The suspension system 107 may adjust vertical smoothness, being a measure of motion up and down relative to the occupant, longitudinal smoothness, being a measure of motion forward and backward relative to the occupant, and lateral smoothness, being a measure of motion left and right relative to the occupant.

Data collectors 110 may include a variety of devices. For example, various controllers in a vehicle may operate as data collectors 110 to provide data 115 via the CAN bus, e.g., data 115 relating to vehicle speed, acceleration, system and/or component functionality, etc., of any number of vehicles 101, including the host vehicle and/or the target vehicle. Further, sensors or the like, global positioning system (GPS) equipment, etc., could be included in a vehicle and configured as data collectors 110 to provide data directly to the computer 105, e.g., via a wired or wireless connection. Sensor data collectors 110 could include mechanisms such as RADAR, LADAR, sonar, etc. sensors that could be deployed to measure a distance between the vehicle 101 and other vehicles or objects. The data collectors 110 may further collect data 115 on a vehicle occupant, including an operation of a user device 150.

Collected data 115 may include a variety of data collected in a vehicle 101. Examples of collected data 115 are provided above, and moreover, data 115 is generally collected using one or more data collectors 110, and may additionally include data calculated therefrom in the computer 105, and/or at the server 125. In general, collected data 115 may include any data that may be gathered by the data collectors 110 and/or computed from such data.

The system 100 further includes a network 120. The network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be configured to determine an appropriate action for one or more vehicles 101, and to provide direction to the computer 105 to proceed accordingly. The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 115, records relating to potential incidents generated as described herein, etc. Further, the server 125 may store information related to particular vehicle 101 and additionally one or more other vehicles 101 operating in a geographic area, traffic conditions, weather conditions, etc., within a geographic area, with respect to a particular road, city, etc. The server 125 could be configured to provide alerts to a particular vehicle 101 and/or other vehicles 101.

The system 100 further includes the user device 150. The user device 150 may be any one of a variety of computing devices including a processor and a memory, e.g., a smartphone, a tablet, a personal digital assistant, etc. the user device 150 may use various wired and/or wireless technologies, e.g., Bluetooth or the like, or even the network 120, to communicate with the vehicle computer 105. The occupant may use the user device 150 for a particular operation, e.g., word processing, listening to music, watching an audiovisual program, office application, spreadsheet management, checking e-mail, playing a video game or other interactive experience, etc.

Figure 2:
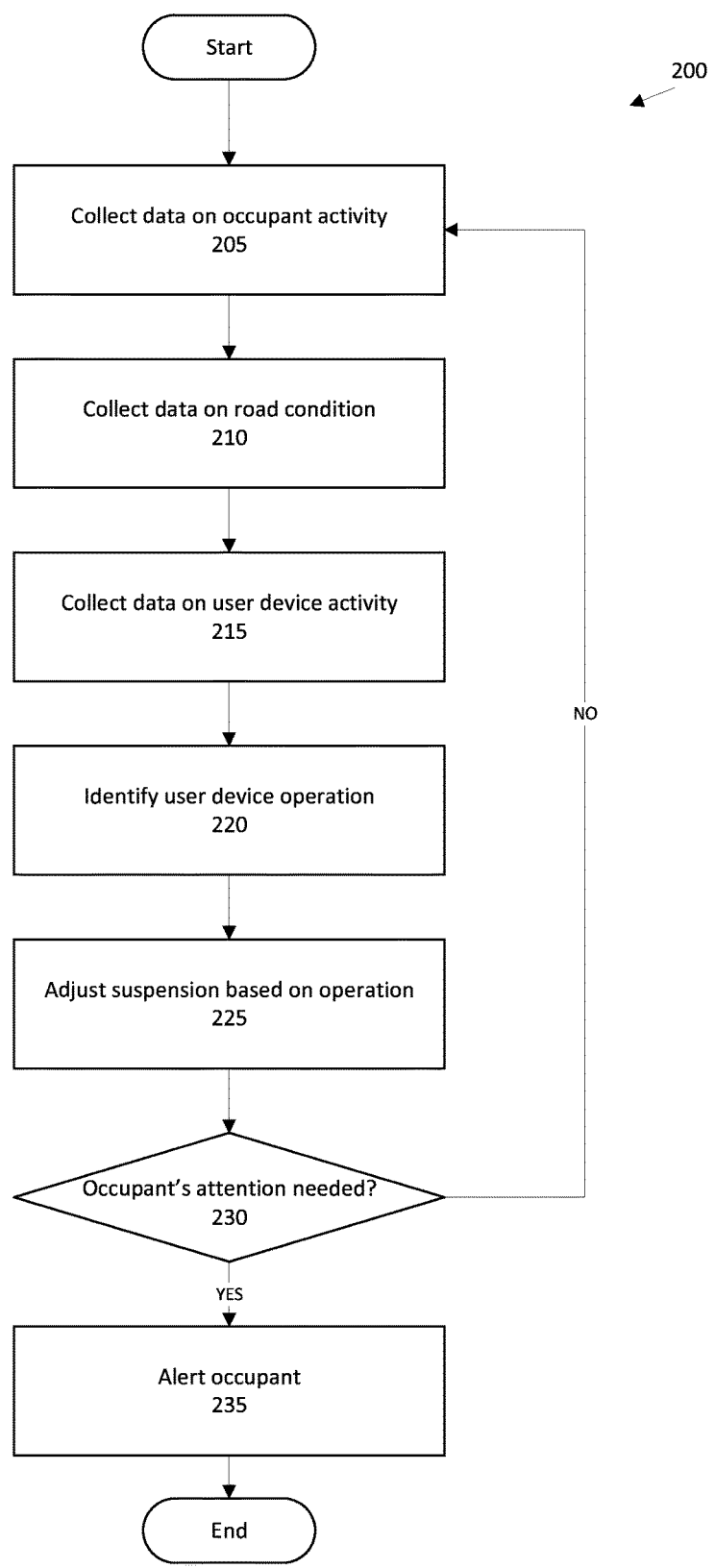
FIG. 2 is a diagram of an exemplary process for adjusting the vehicle suspension system based on an operation of a user device.

FIG. 2 illustrates an example process 200 for adjusting the vehicle suspension system 107 based on the user operation. The process 200 starts in a block 205, in which the computing device 105 begins collection of data 115 concerning occupant activity, such data 115 provided from one or more data collectors 110. The data 115 may include data from camera data collectors 110 and/or accelerometer, motion sensor, weight sensor, etc. data collectors 110 that, possibly included in a user device 150, to provide occupant position, occupant movement, occupant attention, e.g., eye location toward a road or toward the user device 105, user device 150 movement, user device 150 orientation, user device 150 rotation rate, user input error rate, user input legibility, user device 150 location relative to the occupant, etc.

Next, in a block 210, the computing device 105 collects data describing a road condition. For example, the computing device 105 can activate one or more data collectors 110 to collect data 115 describing one or more conditions of a road on which the vehicle 101 is travelling. The condition may include road grade, i.e. slope of the road, road curvature, positions of other vehicles 101, speeds of other vehicles 101, presence of gravel or other rough parts of the road, etc.

Next, in a block 215, the computing device 105 collects data 115 describing activity of the user device 150. The user device 1150 may send data, e.g., via Bluetooth, to the computing device 105 describing use of the user device 150. For example, the user device 150 may notify the computing device 105 that a word processing program is in use and that the occupant is inputting spelling errors at a certain rate, e.g., one per every five words. The user device 150 may also send data 115 specifying, e.g., velocity, acceleration, inertia, position, rotation, etc. of the user device 150. The data 115 may include a user error rate that is a measure of erroneous user inputs to the user device 150. The error rate may result from a bumpy ride or a sharp turn, requiring adjustment of the suspension system 107. The user error rate may be determined by the computing device 105 and/or the user device 150 using data 115.

Next, in a block 220, the computing device 105 identifies an operation of the user device 150. Specifically, the computing device 105 uses the data 115 collected in the blocks 205 and 215 to determine the identity a current operation of the user device 150. The operation may be a particular type of application (e.g., an "app") being used on the device 150 and/or a state of the device 150, e.g., word processing, content viewing, gaming, resting, viewing content, spreadsheet management, etc. Based on the data 115, the computing device 105 may determine a plurality of operations of the user device 150, e.g., when the occupant has a plurality applications running on the user device 150, and his switching between them.

Next, in a block 225, the computing device 105 adjusts the vehicle suspension system 107 based on the operation determined in the block 220. Specifically, the computing device activates the active suspension system, e.g. hydraulics and motors, to dynamically tune the suspension of the vehicle 101 based on the operation. For example, if the operation is word processing, the computing device 105 may adjust the vehicle suspension system 107 to provide a smoother ride and limit input errors by the occupant. In another example, if the operation is listening to music, the computing device 105 may allow the vehicle 101 to maintain a bumpier ride. The computing device 105 may also adjust the light intensity or volume of a vehicle entertainment system. In another example, the operation may have a user device 150 acceleration threshold, e.g. 0.01 g (where g is the acceleration due to gravity), the threshold being dependent on the operation and may be higher or lower depending on the amount of stability needed for the operation. When the user device 150 experiences an acceleration greater than the threshold, the user device 150 sends a signal to the computing device 105 to adjust the vehicle suspension system 107 to reduce the user device 150 acceleration to below the threshold.

The computing device 105 may also adjust a vehicle 101 seat, e.g. an active suspended seat having accelerometers in communication with a linear actuator and/or an electromagnetic motor to limit vibrations on the occupant during vehicle operation, based on the operation. If multiple operations are determined from the block 220, the computing device 105 may adjust the vehicle suspension system 107 such that all of the operations may be performed by the occupant.

Next, in a block 230, executed if the computer 105 is capable of directing autonomous or semi-autonomous operations, the computing device 105 determines whether the occupant's attention is needed. The computing device 105 uses the data 115 on the road condition, occupant activity, and user device 150 operation to determine whether the occupant should stop the current operation and turn their attention to the vehicle 101. For example, the vehicle 101 may arrive at a desired destination, a sharp turn may approach, or the vehicle 101 may be running low on fuel. If the computing device 105 determines that the occupant's attention is needed, the process 200 moves to a block 235. Otherwise, the process 200 returns to the block 205 to collect more data.

In the block 235, the computing device 105 activates at least one vehicle alert to focus the occupant's attention. The vehicle alerts may be of any known type, e.g., haptic, visual, audio, etc. After activating the alerts, the process 200 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps could be omitted, of the steps could be executed in a different order than shown in FIG. 2. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a computer including a processor and a memory, the memory storing instructions executable by the computer to:
    identify a user computing device operated in a vehicle;
    identify, from a plurality of applications available on the user computing device, a specific application currently in use on the user computing device;
    determine a road condition; and
    adjust a vehicle suspension based at least in part on the identified specific application and the road condition.

2. The system of claim 1, wherein the instructions further include instructions to receive data from one or more user computing device sensors to identify the specific application.

3. The system of claim 2, wherein the received data include at least one of user computing device acceleration, user computing device orientation, user computing device rotation rate, user input error rate, user input legibility, and user computing device location.

4. The system of claim 1, wherein the instructions further include instructions to adjust a vehicle seat based on at least one of the road condition and the identified specific application.

5. The system of claim 1, wherein the instructions further include instructions to identify a second application from the plurality of applications available on the user computing device that is in use on the user computing device and to adjust the vehicle suspension based on at least one of the specific application and the second application.

6. The system of claim 1, wherein the plurality of applications includes applications for at least one of word processing, spreadsheet management, viewing content, gaming, and a computing device resting state.

7. The system of claim 1, wherein the instructions further include instructions to adjust at least one of light intensity and volume of a vehicle entertainment system based on the identified application.

8. The system of claim 1, wherein the instructions further include instructions to adjust at least one of longitudinal smoothness of the vehicle suspension, the longitudinal smoothness being a measure of forward and backward movement of the vehicle; lateral smoothness of the vehicle suspension, the lateral smoothness being a measure of left and right movement of the vehicle; and vertical smoothness of the vehicle suspension, the vertical smoothness being a measure of up and down movement of the vehicle.

9. The system of claim 1, wherein the instructions further include instructions to determine a user input error rate of the application, the user input error rate being a measure of input errors by the user, and adjust the vehicle suspension to reduce the user input error rate.

10. The system of claim 1, the instructions further including instructions to alert a vehicle occupant when the occupant's attention is needed.

11. A method, comprising:
    identifying a user computing device operated in a vehicle;
    identifying, from a plurality of applications specific application currently in use on the user computing device;
    determining a road condition; and adjusting a vehicle suspension based at least in part on the identified specific application and the road condition.

12. The method of claim 11, further comprising receiving data from one or more user computing device sensors to identify the specific application.

13. The method of claim 12, wherein the received data include at least one of user computing device acceleration, user computing device orientation, user computing device rotation rate, user input error rate, user input legibility, and user computing device location.

14. The method of claim 11, further comprising adjusting a vehicle seat based on at least one of the road condition and the identified specific application.

15. The method of claim 11, further comprising identifying a second application of the user computing device that is in use on the user computing device and to adjust the vehicle suspension based on at least one of the specific application and the second application.

16. The method of claim 11, wherein the plurality of applications includes applications for at least one of word processing, spreadsheet management, viewing content, gaming, and a computing device resting state.

17. The method of claim 11, further comprising identifying at least one of light intensity and volume of a vehicle entertainment system based on the identified application.

18. The method of claim 11 further comprising adjusting at least one of longitudinal, lateral, and vertical smoothness of the vehicle suspension.

19. The method of claim 11, further comprising determining a user input error rate of the application, the user input error rate being a measure of input errors by the user, and adjust the vehicle suspension to reduce the user input error rate.

20. The method of claim 11, further comprising alerting a vehicle occupant when the occupant's attention is needed.

* * * * *